United States Patent
Kim et al.

(10) Patent No.: US 10,192,015 B2
(45) Date of Patent: Jan. 29, 2019

(54) METHOD OF ESTIMATING A YIELD OF AN INTEGRATED CIRCUIT AND METHOD OF OPTIMIZING A DESIGN FOR AN INTEGRATED CIRCUIT

(71) Applicant: SAMSUNG ELECTRONICS CO., LTD., Suwon-si (KR)

(72) Inventors: Moon-Su Kim, Gimpo-si (KR); Kyoung-Hwan Lim, Seoul (KR); Cheol-Jun Bae, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 88 days.

(21) Appl. No.: 15/096,508

(22) Filed: Apr. 12, 2016

(65) Prior Publication Data

US 2016/0364505 A1 Dec. 15, 2016

(30) Foreign Application Priority Data

Jun. 15, 2015 (KR) .................. 10-2015-0084181

(51) Int. Cl.
*G06F 17/50* (2006.01)
*G06F 9/455* (2018.01)

(52) U.S. Cl.
CPC ........ *G06F 17/505* (2013.01); *G06F 17/5081* (2013.01); *G06F 2217/84* (2013.01)

(58) Field of Classification Search
CPC ............ G06F 2217/84; G06F 17/5031; G06F 17/5045; G06F 17/5009; G06F 17/5036; G06F 17/505; G06F 17/5081; G06F 2217/12; G06F 2217/62

USPC ......... 716/108, 113, 134, 136; 702/117–118, 702/125, 179–183
See application file for complete search history.

(56) References Cited

U.S. PATENT DOCUMENTS

| | | | |
|---|---|---|---|
| 7,243,320 B2 | 7/2007 | Chiu et al. | |
| 7,437,697 B2 | 10/2008 | Venkateswaran et al. | |
| 7,539,893 B1 * | 5/2009 | Ferguson | G01R 31/31718 714/6.1 |
| 7,555,740 B2 | 6/2009 | Buck et al. | |
| 7,689,956 B2 | 3/2010 | Ikeda | |
| 7,739,630 B1 * | 6/2010 | Chen | G06F 17/5068 716/136 |
| 8,046,725 B2 | 10/2011 | Kim et al. | |
| 8,176,461 B1 * | 5/2012 | Trimberger | G06F 17/5036 703/19 |
| 8,302,047 B2 | 10/2012 | Buss et al. | |

(Continued)

FOREIGN PATENT DOCUMENTS

| | | | |
|---|---|---|---|
| JP | 2009-163490 A | 7/2009 | |
| JP | 5321135 B2 | 10/2013 | |

*Primary Examiner* — Nghia M Doan
(74) *Attorney, Agent, or Firm* — Sughrue Mion, PLLC

(57) ABSTRACT

Methods of estimating yields of integrated circuits and methods of optimizing designs for the integrated circuits are provided. In a method of estimating a yield of an integrated circuit, critical paths are extracted from timing paths included in the integrated circuit by performing a static timing analysis for the integrated circuit. The critical paths are grouped into criticality sigma level groups according to criticality sigma levels of the critical paths, and the yield of the integrated circuit is determined based on numbers of the critical paths belonging to the respective criticality sigma level groups.

20 Claims, 14 Drawing Sheets

(56) References Cited

U.S. PATENT DOCUMENTS

| | | | |
|---|---|---|---|
| 8,407,640 B2 | 3/2013 | Le et al. | |
| 8,788,995 B1 | 7/2014 | Kumar et al. | |
| 8,806,412 B1 * | 8/2014 | Wang | G06F 17/5068 |
| | | | 703/13 |
| 8,856,709 B2 | 10/2014 | Foreman et al. | |
| 9,977,845 B2 * | 5/2018 | Kim | G06F 17/5031 |
| 2008/0034338 A1 * | 2/2008 | Hosono | G06F 17/5031 |
| | | | 716/113 |

* cited by examiner

| | MEAN OF SLACK (ps) | SIGMA OF SLACK (ps) | SLACK @ 3-SIGMA (ps) | CRITICALITY SIGMA LEVEL |
|---|---|---|---|---|
| TP1 | 100 | 20 | 40 | 5 |
| TP2 | 310 | 90 | 40 | 3.4 |

HOLD SLACK CALCULATION

HOLD_SLACK = CK-Q_D + DP_D − CP_D − HT

FIG. 4B

| CRITICALITY SIGMA LEVEL GROUP | CRITICALITY SIGMA LEVEL RANGE | REPRESENTATIVE CRITICALITY SIGMA LEVEL | PASS PROBABILITY | # of CRITICAL PATHS |
|---|---|---|---|---|
| GROUP5 | $4.5 < \sigma <= 5.5$ | 5 | 99.99997% | 4 |
| GROUP4 | $3.5 < \sigma <= 4.5$ | 4 | 99.99683% | 23 |
| GROUP3 | $2.5 < \sigma <= 3.5$ | 3 | 99.86501% | 36 |
| GROUP2 | $1.5 < \sigma <= 2.5$ | 2 | 97.72499% | 0 |

FIG. 5

| CRITICALITY SIGMA LEVEL GROUP | PASS PROBABILITY | # of CRITICAL PATHS | YIELD OF GROUP | YIELD OF INTEGRATED CIRCUIT |
|---|---|---|---|---|
| GROUP5 | P5 = 99.99997% | N5 = 4 | P5^N5 = 99.99989% | $\prod (Pi^{\wedge}Ni)$ = P5^N5 * P4^N4*P3^N3 * P2^N2 = 95.18396% |
| GROUP4 | P4 = 99.99683% | N4 = 23 | P4^N4 = 99.92718% | |
| GROUP3 | P3 = 99.86501% | N3 = 36 | P3^N3 = 95.25343% | |
| GROUP2 | P2 = 97.72499% | N2 = 0 | P2^N2 = 100% | |

FIG. 7

| PBA ITERATION | ANALYSIS SIGMA LEVEL | # of CRITICAL PATHS BY PBA | CRITICALITY SIGMA LEVEL GROUP | CRITICALITY SIGMA LEVEL RANGE | # of CRITICAL PATHS |
|---|---|---|---|---|---|
| 1 | 5.5 | 63 | | | |
| 2 | 4.5 | 59 | GROUP5 | 4.5 < σ <= 5.5 | 63 - 59 = 4 |
| 3 | 3.5 | 36 | GROUP4 | 3.5 < σ <= 4.5 | 59 - 36 = 23 |
| 4 | 2.5 | 0 | GROUP3 | 2.5 < σ <= 3.5 | 36 - 0 = 36 |

FIG. 11

| CRITICALITY SIGMA LEVEL GROUP | PASS PROBABILITY | # of CRITICAL PATHS | YIELD OF GROUP | YIELD OF INTEGRATED CIRCUIT |
|---|---|---|---|---|
| GROUP5 | P5 = 99.99997% | N5 = 4 | P5^N5 = 99.99989% | $\prod (P_i^{N_i})$ = P5^N5 * P4^N4' * P3^N3' * P2^N2 = 98.24563% |
| GROUP4 | P4 = 99.99683% | N4 = 23 -> N4' = 47 | P4^N4' = 99.85125% | |
| GROUP3 | P3 = 99.86501% | N3 = 36 -> N3' = 12 | P3^N3' = 98.39210% | |
| GROUP2 | P2 = 97.72499% | N2 = 0 | P2^N2 = 100% | |

METHOD OF ESTIMATING A YIELD OF AN INTEGRATED CIRCUIT AND METHOD OF OPTIMIZING A DESIGN FOR AN INTEGRATED CIRCUIT

CROSS-REFERENCE TO RELATED APPLICATIONS

This application claims priority from Korean Patent Application No. 10-2015-0084181 filed on Jun. 15, 2015 in the Korean Intellectual Property Office, the entire contents of which are incorporated by reference herein in their entireties.

BACKGROUND

1. Technical Field

Methods and apparatuses consistent with exemplary embodiments relate generally to semiconductor circuit designs, more particularly, to estimating yields of integrated circuits and optimizing designs for the integrated circuits.

2. Description of the Related Art

In designing an integrated circuit, such as a system-on-chip (SoC), static timing analysis (STA) is performed to analyze timings of the designed integrated circuit. The static timing analysis may reflect process variations in designing the integrated circuit, thereby improving a yield of the integrated circuit. For example, the static timing analysis may calculate a slack of each timing path included in the integrated circuit to determine whether there is a timing failure at the timing path, and thus a designer of the integrated circuit may correct or modify the design for the integrated circuit based on the calculated slack. However, since the slack calculated by the static timing analysis cannot represent probability information about timing pass or fail, it is difficult to estimate the yield of the integrated circuit based on the slack.

SUMMARY

One or more exemplary embodiments provide a method of estimating a yield of an integrated circuit.

One or more exemplary embodiments also provide a method of optimizing a design for an integrated circuit based on an estimated yield of the integrated circuit.

According to exemplary embodiments, in a method of estimating a yield of an integrated circuit, critical paths are extracted from timing paths included in the integrated circuit by performing a static timing analysis for the integrated circuit. The critical paths are grouped into criticality sigma level groups according to criticality sigma levels of the critical paths, and the yield of the integrated circuit is determined based on numbers of the critical paths belonging to the respective criticality sigma level groups.

In some exemplary embodiments, each critical path may have a slack less than or equal to zero at a sigma level higher than or equal to the criticality sigma level of each critical path.

In some exemplary embodiments, the critical paths may be extracted by performing, as the static timing analysis, a graph based analysis (GBA) for the integrated circuit.

In some exemplary embodiments, to group the critical paths into the criticality sigma level groups, a path based analysis (PBA) for the critical paths may be performed at maximum criticality sigma levels of the criticality sigma level groups, and the numbers of the critical paths belonging to the respective criticality sigma level groups may be determined based on a result of the PBA performed at the maximum criticality sigma levels of the criticality sigma level groups.

In some exemplary embodiments, a number of the critical paths belonging to a first one of the criticality sigma level groups may be determined based on a difference between a number of the critical paths at the maximum criticality sigma level of the first one of the criticality sigma level groups and a number of the critical paths at the maximum criticality sigma level of a second one of the criticality sigma level groups.

In some exemplary embodiments, to group the critical paths into the criticality sigma level groups, the criticality sigma levels of the critical paths may be determined based on average slacks of the critical paths and 1-sigma level process variations of the critical paths, and the critical paths may be grouped into the criticality sigma level groups based on the determined criticality sigma levels.

In some exemplary embodiments, the criticality sigma level of each critical path may be determined by dividing the average slack of each critical path by the 1-sigma level process variation of each critical path.

In some exemplary embodiments, to determine the yield of the integrated circuit, yields of the criticality sigma level groups may be determined by raising a pass probability of each criticality sigma level group to a power of the numbers of the critical paths belonging to the each criticality sigma level group, and the yield of the integrated circuit may be determined by multiplying the yields of the criticality sigma level groups together.

According to exemplary embodiments, in a method of optimizing a design for an integrated circuit, critical paths are extracted from timing paths included in the integrated circuit by performing a static timing analysis for the integrated circuit. The critical paths are grouped into criticality sigma level groups according to criticality sigma levels of the critical paths, the yield of the integrated circuit is determined based on numbers of the critical paths belonging to the respective criticality sigma level groups, and design optimization information is generated based on the determined yield of the integrated circuit and the criticality sigma level groups.

In some exemplary embodiments, the design optimization information may include information representing a number of the critical paths which need to be changed from a first one of the criticality sigma level groups to a second one of the criticality sigma level groups.

In some exemplary embodiments, the second one of the criticality sigma level groups may have a representative criticality sigma level higher than a representative criticality sigma level of the first one of the criticality sigma level groups.

In some exemplary embodiments, the design optimization information may further include information representing a number of the critical paths which need to be changed from a third one of the criticality sigma level groups to a fourth one of the criticality sigma level groups, and the fourth one of the criticality sigma level groups may have a representative criticality sigma level lower than a representative criticality sigma level of the third one of the criticality sigma level groups.

In some exemplary embodiments, the determined yield of the integrated circuit may be compared with a target yield for the integrated circuit, and the design optimization information may be generated when the determined yield is lower than target yield.

In some exemplary embodiments, to generate the design optimization information, until the determined yield becomes higher than or equal to the target yield, the critical path belonging to a first criticality sigma level group having a lowest representative criticality sigma level among the criticality sigma level groups may be changed such that the critical path belongs to a second criticality sigma level group having a representative criticality sigma level higher than the lowest representative criticality sigma level among the criticality sigma level groups, and the design optimization information representing a number of the critical paths changed from the first criticality sigma level group to the second criticality sigma level group may be generated.

In some exemplary embodiments, to generate the design optimization information, a set of $X_{ij}$ satisfying that the determined yield is higher than or equal to the target yield and that an equation "$\Sigma((j-i)*X_{ij})$" is minimized may be obtained, where i is an integer representing a representative criticality sigma level of the criticality sigma level group to which the critical paths belong before optimization, j is an integer representing a representative criticality sigma level of the criticality sigma level group to which the critical paths belong after the optimization, and $X_{ij}$ represents a number of the critical paths changed from the criticality sigma level group having the representative criticality sigma level of i to the criticality sigma level group having the representative criticality sigma level of j, and the design optimization information representing the set of $X_{ij}$ may be generated.

In some exemplary embodiments, the set of $X_{ij}$ may be determined by performing an integer linear programming for the equation "$\Sigma((j-i)*X_{ij})$".

According to exemplary embodiments, in a method of optimizing a design for an integrated circuit, critical paths are extracted from timing paths included in the integrated circuit by performing a GBA for the integrated circuit. A PBA for the critical paths is performed at maximum criticality sigma levels of criticality sigma level groups, numbers of the critical paths belonging to the respective criticality sigma level groups are determined based on a result of the PBA performed at the maximum criticality sigma levels of the criticality sigma level groups, a yield of the integrated circuit is determined based on the numbers of the critical paths belonging to the respective criticality sigma level groups, the determined yield of the integrated circuit is compared with a target yield for the integrated circuit, and design optimization information is generated based on a result of the comparison of the determined yield with the target yield.

In some exemplary embodiments, to determine the yield of the integrated circuit, yields of the criticality sigma level groups are determined by raising a pass probability of each criticality sigma level group to a power of the numbers of the critical paths belonging to the each criticality sigma level group, and the yield of the integrated circuit is determined by multiplying the yields of the criticality sigma level groups together.

In some exemplary embodiments, the design optimization information may include information representing a number of the critical paths which need to be changed from a first one of the criticality sigma level groups to a second one of the criticality sigma level groups, and the second one of the criticality sigma level groups may have a representative criticality sigma level higher than a representative criticality sigma level of the first one of the criticality sigma level groups.

In some exemplary embodiments, to generate the design optimization information, until the determined yield becomes higher than or equal to the target yield, the critical path belonging to a first criticality sigma level group having a lowest representative criticality sigma level among the criticality sigma level groups may be changed such that the critical path belongs to a second criticality sigma level group having a representative criticality sigma level higher than the lowest representative criticality sigma level among the criticality sigma level groups, and the design optimization information representing a number of the critical paths changed from the first criticality sigma level group to the second criticality sigma level group may be generated.

BRIEF DESCRIPTION OF THE DRAWINGS

Illustrative, non-limiting exemplary embodiments will be more clearly understood from the following detailed description taken in conjunction with the accompanying drawings, in which:

FIGS. 4A and 4B are diagrams for describing an example where critical paths are grouped into criticality sigma level groups according to criticality sigma levels of the critical paths;

FIG. 5 is a diagram for describing an example of calculating a yield of an integrated circuit based on the numbers of critical paths belonging to respective criticality sigma level groups;

FIG. 7 is a diagram for describing an example of grouping critical paths by performing a path based analysis (PBA) in the yield estimation method of FIG. 6;

FIG. 11 is a diagram for describing an example where a yield of an integrated circuit is improved by the design optimization method of FIG. 10;

DETAILED DESCRIPTION

Figures 1A, 1B:
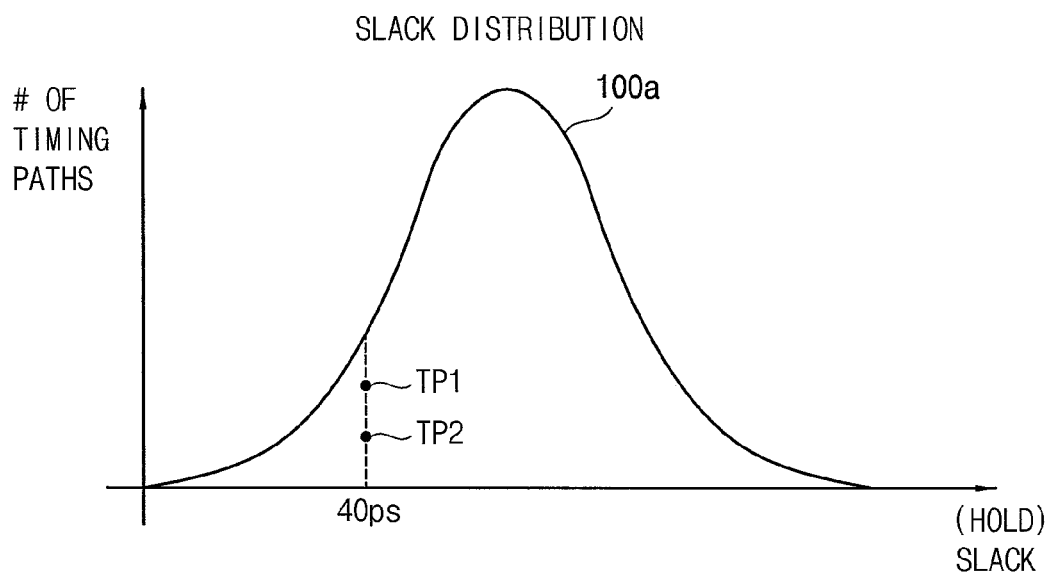
FIG. 1A is a diagram illustrating an example of a slack distribution of an integrated circuit.
FIG. 1B is a diagram illustrating examples of criticality sigma levels of first and second timing paths in the slack distribution of FIG. 1A.

Various exemplary embodiments will be described more fully with reference to the accompanying drawings, in which embodiments are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, decimals, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1C:
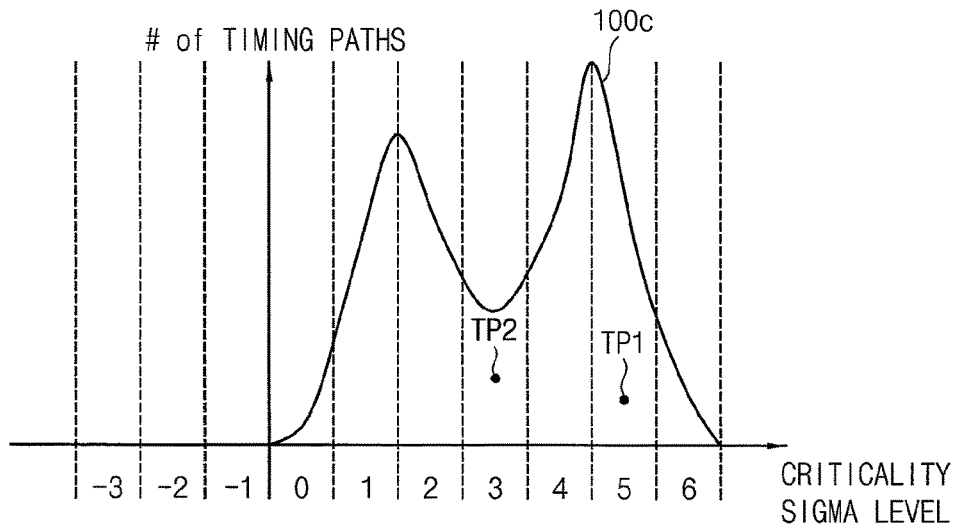
FIG. 1C is a diagram illustrating an example of a criticality sigma level distribution of the integrated circuit having the slack distribution of FIG. 1A.

FIG. 1A is a diagram illustrating an example of a slack distribution of an integrated circuit, FIG. 1B is a diagram illustrating examples of criticality sigma levels of first and second timing paths in the slack distribution of FIG. 1A, and FIG. 1C is a diagram illustrating an example of a criticality sigma level distribution of the integrated circuit having the slack distribution of FIG. 1A.

In designing an integrated circuit, such as a system-on-chip (SoC), static timing analysis (STA) is performed to analyze timings of the designed integrated circuit. The STA may calculate a slack of each timing path included in the integrated circuit to determine whether the timing path has a timing pass or a timing fail. For example, a slack of a timing path calculated by the STA has a value less than or equal to zero, and the timing path may be determined as a critical path where a timing failure may occur. However, the slack cannot accurately represent probability information about the timing pass or fail.

For example, the integrated circuit may have a slack distribution 100a as illustrated in FIG. 1A. Generally, although a timing path having a relatively low slack value tends to have a probability of the timing fail higher than that of timing path having a relatively high slack value, the slack may not be exactly inversely proportional to the probability of the timing fail. That is, the slack may not be exactly proportional to a probability of the timing pass.

For example, the slack distribution 100a illustrated in FIG. 1A may be a distribution of slacks of timing paths TP1 and TP2 calculated at 3-sigma level, and a first timing path TP1 and a second timing path TP2 may have the same slack value, or about 40 ps at the 3-sigma (or 3-standard deviation) level. The slack may be expressed as the following Equation 1.

$$\text{SLACK} = \text{MEAN\_SLACK} - N*\text{SIGMA\_SLACK} \qquad \text{[Equation 1]}$$

Here, SLACK represents a slack value of a timing path, MEAN_SLACK represents an average slack value of the timing path, N represents a sigma level, and SIGMA_SLACK represents a process variation at 1-sigma level. Thus, "N*SIGMA_SLACK" may be a process variation at N-sigma level. Here, the process variation at the 1-sigma level may be referred to as a sigma or a standard deviation.

In an example, the first and second timing paths TP1 and TP2 having the same slack value in FIG. 1A may have different average slacks, and may have different process variations at 1-sigma level. For example, as illustrated in FIG. 1B, the first timing path TP1 may have the average slack of about 100 ps and a process variation of about 20 ps at 1-sigma level, and the second timing path TP2 may have the average slack of about 30 ps and a process variation of about 90 ps at 1-sigma level. A criticality sigma level where each timing path TP1 and TP2 becomes the critical path, or a sigma level where the slack of each timing path TP1 and TP2 becomes zero may be calculated using the following Equation 2 by substituting a value of 0 for "SLACK" in Equation 1.

$$\text{CRITICALITY} = \text{MEAN\_SLACK}/\text{SIGMA\_SLACK} \qquad \text{[Equation 2]}$$

Here, CRITICALITY is the criticality sigma level, and represents a sigma level at which each timing path becomes the critical path, or a sigma level at which a slack of each timing path becomes zero.

The first timing path TP1 illustrated in FIG. 1B has a criticality sigma level of about five, and the second timing path TP1 illustrated in FIG. 1B has a criticality sigma level of about 3.4. Thus, the first timing path TP1 may have a slack less than or equal to zero at a sigma level higher than or equal to about five, which means that the first timing path TP1 has a timing path probability of about 99.99997%. Further, the second timing path TP2 may have a slack less than or equal to zero at a sigma level higher than or equal to about 3.4, which means that the second timing path TP2 has a timing path probability of about 99.96631%. Accordingly, although the first and second timing paths TP1 and TP2 have the same slack value at the 3-sigma level, the first and second timing paths TP1 and TP2 may have different timing path probabilities. Thus, the slack may not be exactly proportional to the timing pass probability. However, the criticality sigma levels may be proportional to the timing pass probability. Therefore, in a method of estimating a yield of an integrated circuit according to exemplary embodiments, the yield of the integrated circuit may be calculated based on the criticality sigma levels of the respective timing paths.

For example, in the method of estimating the yield of an integrated circuit according to exemplary embodiments, the slack distribution 100a of the integrated circuit illustrated in FIG. 1A may be converted into a criticality sigma level distribution 100c of the integrated circuit illustrated in FIG. 1C, and the yield of the integrated circuit may be estimated based on the criticality sigma level distribution 100c. In the yield estimation method according to some exemplary embodiments, respective timing paths TP1 and TP2 may be grouped into criticality sigma level groups according to the criticality sigma levels of the timing paths TP1 and TP2, and the yield of the integrated circuit may be estimated based on the numbers of the timing paths TP1 and TP2 belonging to the respective criticality sigma level groups. Accordingly, an amount of calculation of the yield estimation may be reduced while maintaining the accuracy of the estimated yield.

Here, in some exemplary embodiments, the slack may be a hold slack, the criticality sigma level may be a criticality sigma level for a hold timing failure, and the estimated yield may be a parametric yield of which reduction is caused by the hold timing failure. Thus, the yield estimation method according to some exemplary embodiments may estimate the parametric yield that is reduced by the hold timing failure in designing the integrated circuit. Further, a method of optimizing a design for an integrated circuit according to exemplary embodiments may modify and/or change the design for the integrated circuit based on the estimated yield such that the yield of the integrated circuit becomes higher than or equal to a target yield, or such that the design for the integrated circuit is optimized in power, size, etc. while the target yield is satisfied.

Figure 2:
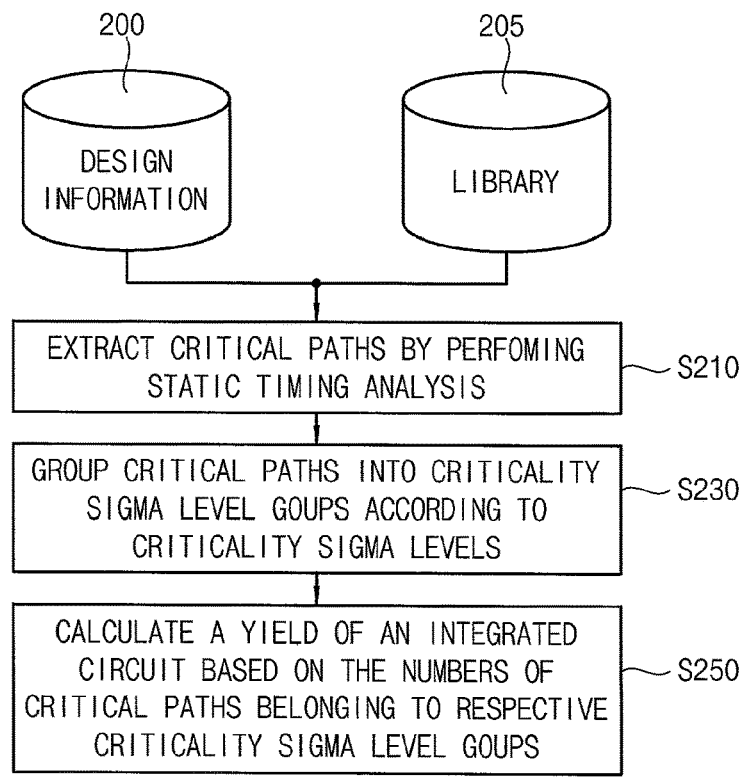
FIG. 2 is a flowchart illustrating a method of estimating a yield of an integrated circuit according to exemplary embodiments.
Figure 3:
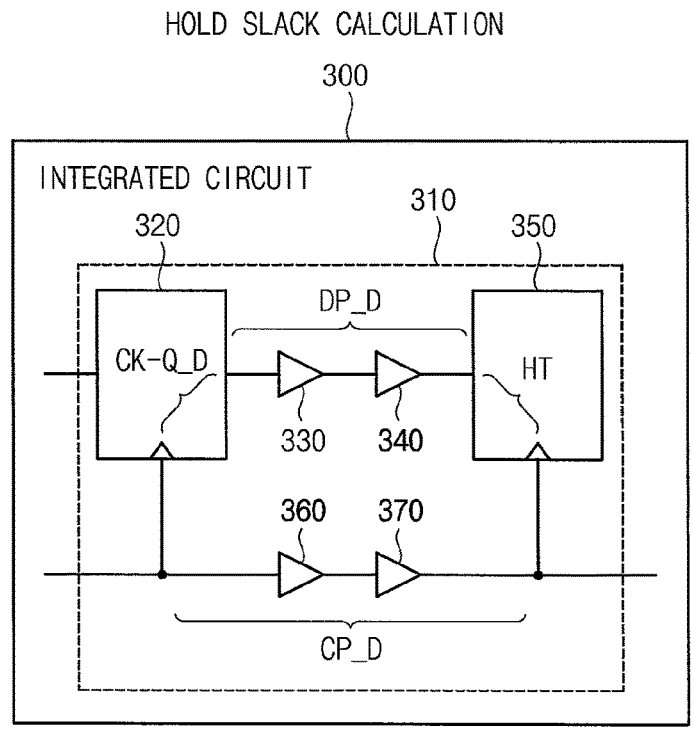
FIG. 3 is a diagram for describing an example of calculating a hold slack of a timing path included in an integrated circuit.
Figure 4A:
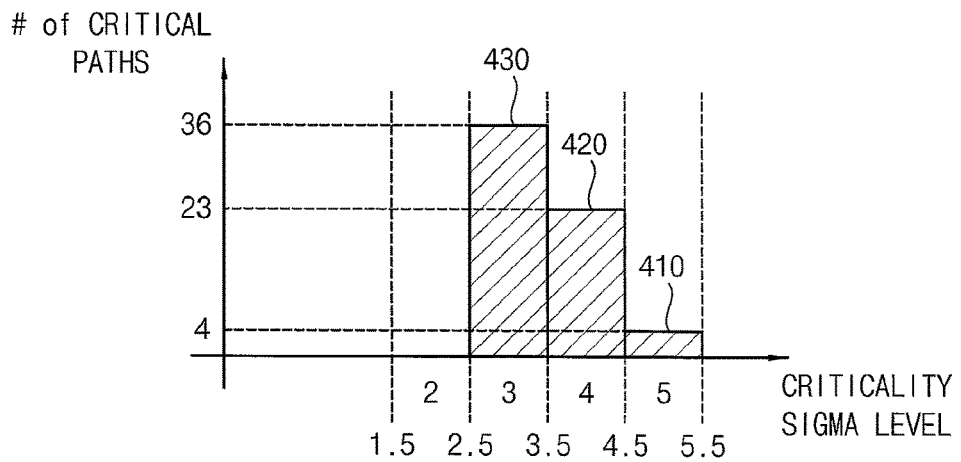

FIG. 2 is a flowchart illustrating a method of estimating a yield of an integrated circuit according to exemplary embodiments, FIG. 3 is a diagram for describing an example of calculating a hold slack of a timing path included in an integrated circuit, FIGS. 4A and 4B are diagrams for describing an example where critical paths are grouped into criticality sigma level groups according to criticality sigma levels of the critical paths, and FIG. 5 is a diagram for describing an example of calculating a yield of an integrated circuit based on the numbers of critical paths belonging to respective criticality sigma level groups.

Referring to FIG. 2, in a method of estimating a yield of an integrated circuit (e.g., SoC) according to exemplary embodiments, critical paths having a slack (e.g., a hold slack) less than or equal to zero at a predetermined sigma level (e.g., 6-sigma level) are extracted from timing paths included in the integrated circuit by performing an STA based on design information 200 for the integrated circuit and a library 205 for the integrated circuit (S210).

The design information 200 for the integrated circuit may include a netlist representing types of cells (e.g., standard cells) included in the integrated circuit and connection relationship between the cells. For example, the netlist may be described in a hardware description language (HDL), such as a Verilog. In some exemplary embodiments, the design information 200 for the integrated circuit may further include parasitic data information, such as standard parasitic exchange format (SPEF) information that represents resistances, capacitances and inductances of wirings included in the integrated circuit, and/or design constraint information, such as Synopsys design constraint (SDC) information that represents timing constraints required by the integrated circuit.

The library 205 for the integrated circuit may include process variation information for the cells, or timing arcs of the cells, included in the integrated circuit. In exemplary embodiments, the process variation information may be local random process variation information that represents a variation, such as a delay variation, between timing arcs or transistors within the integrated circuit. In some exemplary embodiments, the library 205 for the integrated circuit may further include delay information, function definitions, power information, noise information, etc., for the cells.

In an example illustrated in FIG. 3, by the STA, a hold slack of a timing path 310 between first and second flip-flops 320 and 350 of an integrated circuit 300 may be calculated using the following Equation 3.

$$HOLD\_SLACK = CK\_Q\_D + DP\_D - CP\_D - HT \qquad [\text{Equation 3}]$$

Here, HOLD_SLACK represents the hold slack of the timing path 310, and CK_Q_D represents a clock-data delay of the first flip-flop 320, which may be provided by the library 205. DP_D represents a delay of a data path of the timing path 310, which may be calculated based on delays of first and second buffers 330 and 340 included in the data path of the timing path 310. CP_D represents a delay of a clock path of the timing path 310, which may be calculated based on delays of third and fourth buffers 360 and 370 included in the clock path of the timing path 310. Information about the delays of the first, second, third and fourth buffers 330, 340, 360 and 370 may be provided by the library 205. HT represents a hold time of the second flip-flop 350, which may be provided by the library 205.

By calculating the slacks of the timing paths included in the integrated circuit through the STA, the critical paths may be extracted from the timing paths included in the integrated circuit. In some exemplary embodiments, the critical paths may be extracted by performing, as the STA, a graph based analysis (GBA) for the integrated circuit. The GBA may calculate the slack (e.g., the hold slack) with pessimism. For example, to calculate the hold slack with pessimism, a process variation at a nominal (NN) corner may be applied with respect to the data path of the timing path 310, and a process variation at a slow (SS) corner may be applied with respect to the clock path of the timing path 310. In other exemplary embodiments, the critical paths may be extracted by performing the GBA and a path based analysis (PBA) for the integrated circuit. In this case, the PBA may be further performed on the critical paths extracted by the GBA, and the critical paths extracted by the PBA may be determined as final critical paths. The PBA may calculate the slack (e.g., the hold slack) without pessimism. Thus, the PBA may calculate the hold slack at each timing corner (e.g., the slow (SS) corner and/or a fast (FF) corner).

The critical paths extracted by the STA are grouped into criticality sigma level groups according to criticality sigma levels of the critical paths (S230). Here, the criticality sigma level may represent a sigma level at which each timing path becomes the critical path, or a sigma level at which the slack (e.g., the hold slack) of each timing path becomes zero. Thus, each critical path may have the slack less than or equal to zero at a sigma level higher than or equal to the criticality sigma level of the critical path.

In some exemplary embodiments, the critical paths may be grouped into the criticality sigma level groups by repeatedly performing the PBA for the critical paths. For example, the PBA for the critical paths may be performed at maximum criticality sigma levels of the criticality sigma level groups, and the numbers of the critical paths belonging to the respective criticality sigma level groups may be calculated based on a result of the PBA performed at the maximum criticality sigma levels of the criticality sigma level groups. In other exemplary embodiments, the critical paths may be grouped into the criticality sigma level groups based on average slacks of the critical paths obtained by the STA and process variations of 1-sigma level. For example, the criticality sigma levels of the critical paths may be calculated based on the average slacks of the critical paths and the 1-sigma level process variations of the critical paths, and the critical paths may be grouped into the criticality sigma level groups based on the calculated criticality sigma levels.

For example, as illustrated in FIGS. 4A and 4B, critical paths 410 having the criticality sigma level higher than 4.5 and lower than or equal to 5.5 may have grouped into a criticality sigma level group GROUP5 having a representative criticality sigma level of five, critical paths 420 having the criticality sigma level higher than 3.5 and lower than or equal to 4.5 may have grouped into a criticality sigma level group GROUP4 having a representative criticality sigma level of four, and critical paths 430 having the criticality sigma level higher than 2.5 and lower than or equal to 3.5 may have grouped into a criticality sigma level group GROUP3 having a representative criticality sigma level of three. A pass probability of each criticality sigma level group GROUP5, GROUP4, GROUP3 and GROUP2 may be determined based on its representative criticality sigma level. For example, the criticality sigma level group GROUP5 having the representative criticality sigma level of five may have a pass probability of about 99.99997%, the criticality sigma level group GROUP4 having the representative criticality sigma level of four may have a pass probability of about 99.99683%, the criticality sigma level group GROUP3 having the representative criticality sigma level of three may have a pass probability of about 99.86501%, and the criticality sigma level group GROUP2 having the representative criticality sigma level of two may have a pass probability of about 97.72499%. In an example illustrated in FIGS. 4A and 4B, the critical paths having the criticality sigma levels lower than or equal to 2.5 or higher than 5.5 may not exist, or may be excluded since the critical paths do not affect the yield of the integrated circuit. For example, the timing path having the criticality sigma level higher than six may have an extremely low probability of the timing fail, and thus the timing path having the criticality sigma level higher than six may be excluded by performing the STA at 6-sigma level.

Grouping the critical paths into the criticality sigma level groups according to the criticality sigma levels of the critical paths may be referred to as "criticality binning". Further, the criticality sigma level group may be referred to as a "criticality bin". In addition, a table of the criticality sigma level groups illustrated in FIG. 4B may be referred to as a "criticality bin table".

A yield of the integrated circuit is calculated based on the numbers of the critical paths belonging to the respective criticality sigma level groups (S250). In some exemplary embodiments, yields of the criticality sigma level groups may be calculated by raising a pass probability of each criticality sigma level group to a power of the number of the critical paths belonging to the criticality sigma level group, and the yield of the integrated circuit may be calculated by multiplying the yields of the criticality sigma level groups together.

For example, in an example illustrated in FIGS. 4A, 4B and 5, since the criticality sigma level group GROUP5 having the representative criticality sigma level of five has the pass probability of about 99.99997%, and the number N5 of the critical paths belonging to the criticality sigma level group GROUP5 is five, the yield P5^N5 of the criticality sigma level group GROUP5 may be calculated by raising 99.99997% to the fourth power, and thus may be about 99.99989%. Since the criticality sigma level group GROUP4 having the representative criticality sigma level of four has the pass probability of about 99.99683%, and the number N4 of the critical paths belonging to the criticality sigma level group GROUP4 is 23, the yield P4^N4 of the criticality sigma level group GROUP4 may be calculated by raising 99.99683% to the twenty-third power, and thus may be about 99.92718%. Since the criticality sigma level group GROUP3 having the representative criticality sigma level of three has the pass probability of about 99.86501%, and the number N3 of the critical paths belonging to the criticality sigma level group GROUP3 is 36, the yield P3^N3 of the criticality sigma level group GROUP3 may be calculated by raising 99.86501% to the twenty-third power, and thus may be about 95.25343%. Since the number N2 of the critical paths belonging to the criticality sigma level group GROUP2 having the representative criticality sigma level of two, the yield P2^N2 of the criticality sigma level group GROUP2 may be 100%. The yield Π(Pi^Ni) of the integrated circuit may be calculated by multiplying the yields P5^N5, P4^N4, P3^N3 and P2^N2 of the criticality sigma level groups together, and, in the example illustrated in FIGS. 4A, 4B and 5, may be "99.99989%*99.92718%*95.25343%*100%=95.18396%".

In some exemplary embodiments, the calculated yield of the integrated circuit may be provided as a final yield of the integrated circuit. In other exemplary embodiments, the yield estimation method may multiply the calculated yield by an empirical coefficient, and may provide a result of the multiplication as the final yield.

As described above, in the method of estimating the yield of the integrated circuit according to exemplary embodiments, the critical paths may be grouped into the criticality sigma level groups according to the criticality sigma levels of the critical paths obtained by the STA, and thus the yield of the integrated circuit may be efficiently and accurately calculated based on the criticality sigma level groups.

Figure 6:
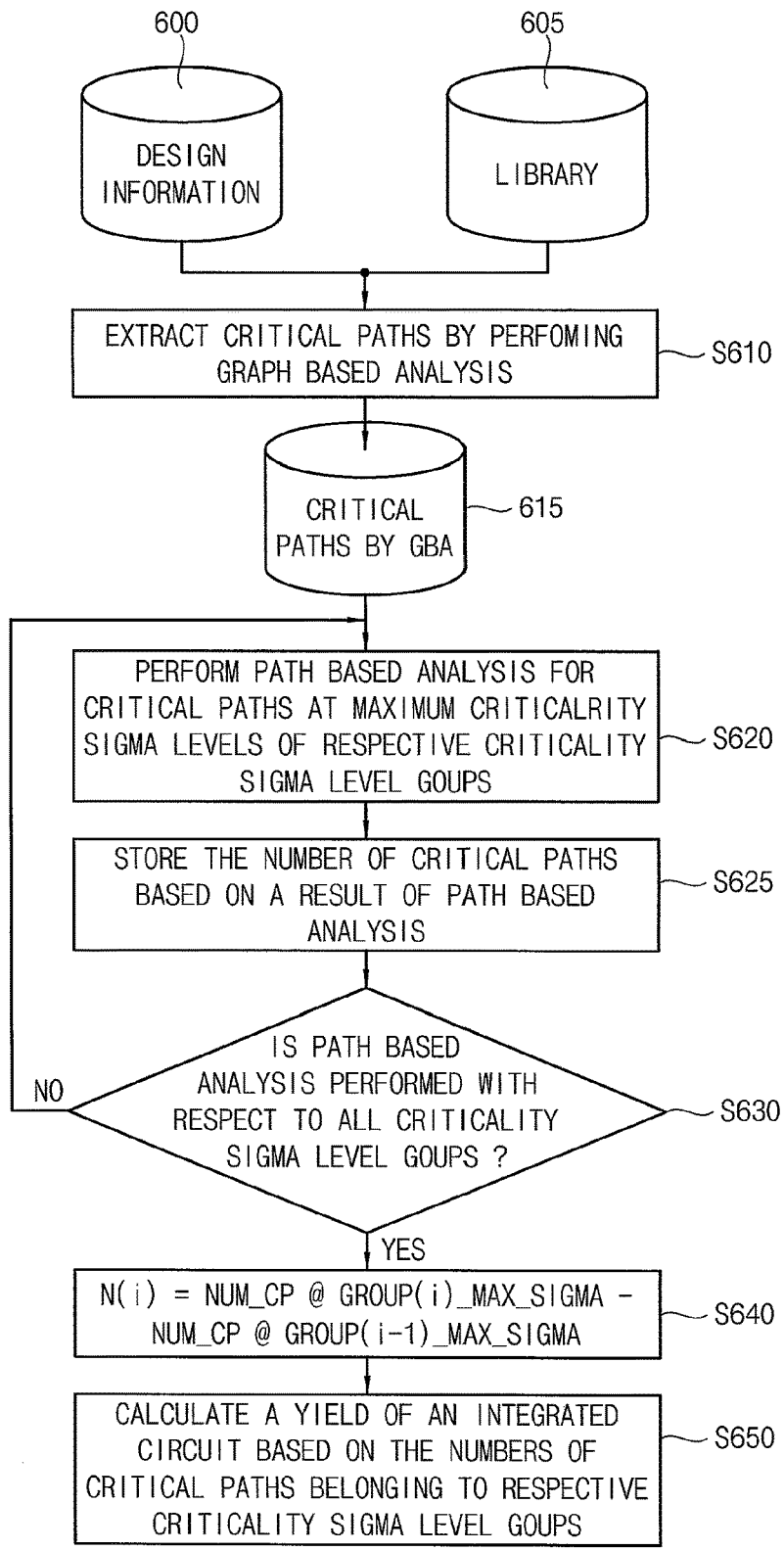
FIG. 6 is a flowchart illustrating a method of estimating a yield of an integrated circuit according to exemplary embodiments.

FIG. 6 is a flowchart illustrating a method of estimating a yield of an integrated circuit according to exemplary embodiments, and FIG. 7 is a diagram for describing an example of grouping critical paths by performing a path based analysis (PBA) in the yield estimation method of FIG. 6.

Referring to FIG. 6, in a method of estimating a yield of an integrated circuit, critical paths 615 having a slack (e.g., a hold slack) less than or equal to zero at a predetermined sigma level (e.g., 6-sigma level) may be extracted from timing paths included in the integrated circuit by performing a GBA for the integrated circuit based on design information 600 for the integrated circuit and a library 605 for the integrated circuit (S610).

The critical paths 615 extracted by the GBA may be grouped into criticality sigma level groups according to criticality sigma levels of the critical paths 615 by performing a PBA for the critical paths 615 (S620, S625, S630, S640). In some exemplary embodiments, the PBA for the critical paths 615 may be performed at maximum criticality sigma level groups of the respective criticality sigma level groups (S620), and the number of the critical paths obtained by the PBA may be stored (S625). Until the PBA is performed with respect to all possible criticality sigma level groups (S630: NO), the PBA and the subsequent storing of the number of the critical paths may be repeatedly performed (S620, S625). Once the PBA is completed with respect to the all possible criticality sigma level groups (S630: YES), the numbers of the critical paths belonging to the respective criticality sigma level groups may be calculated based on a result of the PBA (S640). In some exemplary embodiments, the number of the critical paths belonging to a first one of the criticality sigma level groups is calculated based on a difference between the number of the critical paths at the maximum criticality sigma level of the first one of the criticality sigma level groups and the number of the critical paths at the maximum criticality sigma level of a second one (or the adjacent one) of the criticality sigma level groups. That is, the number N(i) of the critical paths of the criticality sigma level group having the representative criticality sigma level of i may be calculated by subtracting the number NUM_CP@GROUP(i−1)_MAX_SIGMA of the critical paths at the maximum criticality sigma level GROUP(i−1)_MAX_SIGMA of the criticality sigma level group having the representative criticality sigma level of i−1 from the number NUM_CP@GROUP(i)_MAX_SIGMA of the critical paths at the maximum criticality sigma level GROUP(i)_MAX_SIGMA of the criticality sigma level group having the representative criticality sigma level of i.

For example, in an example illustrated in FIG. 7, a first PBA may be performed at a maximum criticality sigma level (i.e., 5.5-sigma level) of a criticality sigma level group GROUP5 having a representative criticality sigma level of five, and 63 critical paths may be extracted at the 5.5-sigma level by the first PBA. Subsequently, a second PBA may be performed at a maximum criticality sigma level (i.e., 4.5-sigma level) of a criticality sigma level group GROUP4 having a representative criticality sigma level of four, and 59 critical paths may be extracted at the 4.5-sigma level by the second PBA. In this case, the number of the critical paths of the criticality sigma level group GROUP5 having the representative criticality sigma level of five may be calculated as a difference (i.e., 4) between the number (i.e., 63) of the critical paths obtained by the first PBA and the number (i.e., 59) of the critical paths obtained by the second PBA. A third PBA may be performed at a maximum criticality sigma level (i.e., 3.5-sigma level) of a criticality sigma level group GROUP3 having a representative criticality sigma level of three, and 36 critical paths may be extracted at the 3.5-sigma level by the third PBA. In this case, the number of the critical paths of the criticality sigma level group GROUP4 having the representative criticality sigma level of four may be 59−36=23. A fourth PBA may be performed at a maximum criticality sigma level (i.e., 2.5-sigma level) of a criticality sigma level group GROUP2 having a representative criticality sigma level of two, and no critical path may be extracted at the 2.5-sigma level by the fourth PBA. In this case, the number of the critical paths of the criticality sigma level group GROUP3 having the representative criticality sigma level of three may be 36 (36−0=36). Once no critical path is extracted, the PBA may not be performed any longer.

A yield of the integrated circuit may be calculated based on the numbers of the critical paths belonging to the respective criticality sigma level groups (S650). In some exemplary embodiments, yields of the criticality sigma level groups may be calculated by raising a pass probability of each criticality sigma level group to a power of the number of the critical paths belonging to the criticality sigma level group, and the yield of the integrated circuit may be calculated by multiplying the yields of the criticality sigma level groups together.

Figure 8:
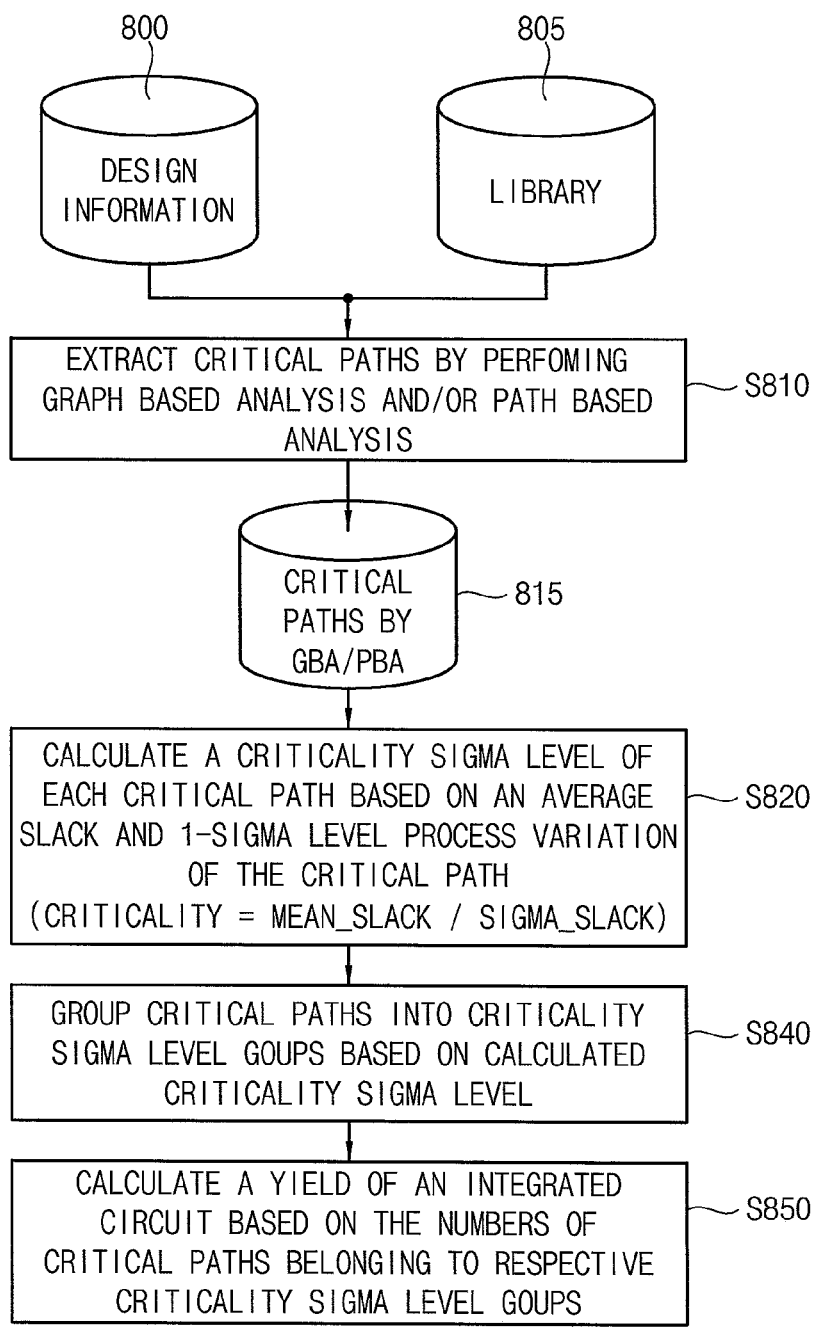
FIG. 8 is a flowchart illustrating a method of estimating a yield of an integrated circuit according to exemplary embodiments.

FIG. 8 is a flowchart illustrating a method of estimating a yield of an integrated circuit according to exemplary embodiments.

Referring to FIG. 6, in a method of estimating a yield of an integrated circuit, critical paths 815 having a slack (e.g., a hold slack) less than or equal to zero at a predetermined sigma level (e.g., 6-sigma level) may be extracted from timing paths included in the integrated circuit by performing a GBA and/or a PBA for the integrated circuit based on design information 800 for the integrated circuit and a library 805 for the integrated circuit (S810). In some exemplary embodiments, the critical paths 815 may be extracted by the GBA. In other exemplary embodiments, to extract the critical paths 815, the GBA may be performed, and then the PBA may be further performed. In this case, the critical paths 815 may be more accurately extracted.

The GBA and/or the PBA may extract not only the critical paths 815, but also average slacks of the critical paths 815 and 1-sigma level process variations of the critical paths 815. The yield estimation method according to exemplary embodiments may group the critical paths 815 into criticality sigma level groups based on the average slacks and the 1-sigma level process variations of the critical paths 815 (S820, S840). In some exemplary embodiments, criticality sigma levels of the critical paths 815 may be calculated based on the average slacks of the critical paths 815 and the 1-sigma level process variations of the critical paths 815 (S820), and the critical paths 815 may be grouped into the criticality sigma level groups based on the calculated criticality sigma levels (S840). For exemplary, the criticality sigma level of each critical path 815 may be calculated by dividing the average slack MEAN_SLACK of the critical path 815 by the 1-sigma level process variation SIGMA_SLACK of the critical path 815.

A yield of the integrated circuit may be calculated based on the numbers of the critical paths 815 belonging to the respective criticality sigma level groups (S850). In some exemplary embodiments, yields of the criticality sigma level groups may be calculated by raising a pass probability of each criticality sigma level group to a power of the number of the critical paths belonging to the criticality sigma level group, and the yield of the integrated circuit may be calculated by multiplying the yields of the criticality sigma level groups together.

Figure 9:
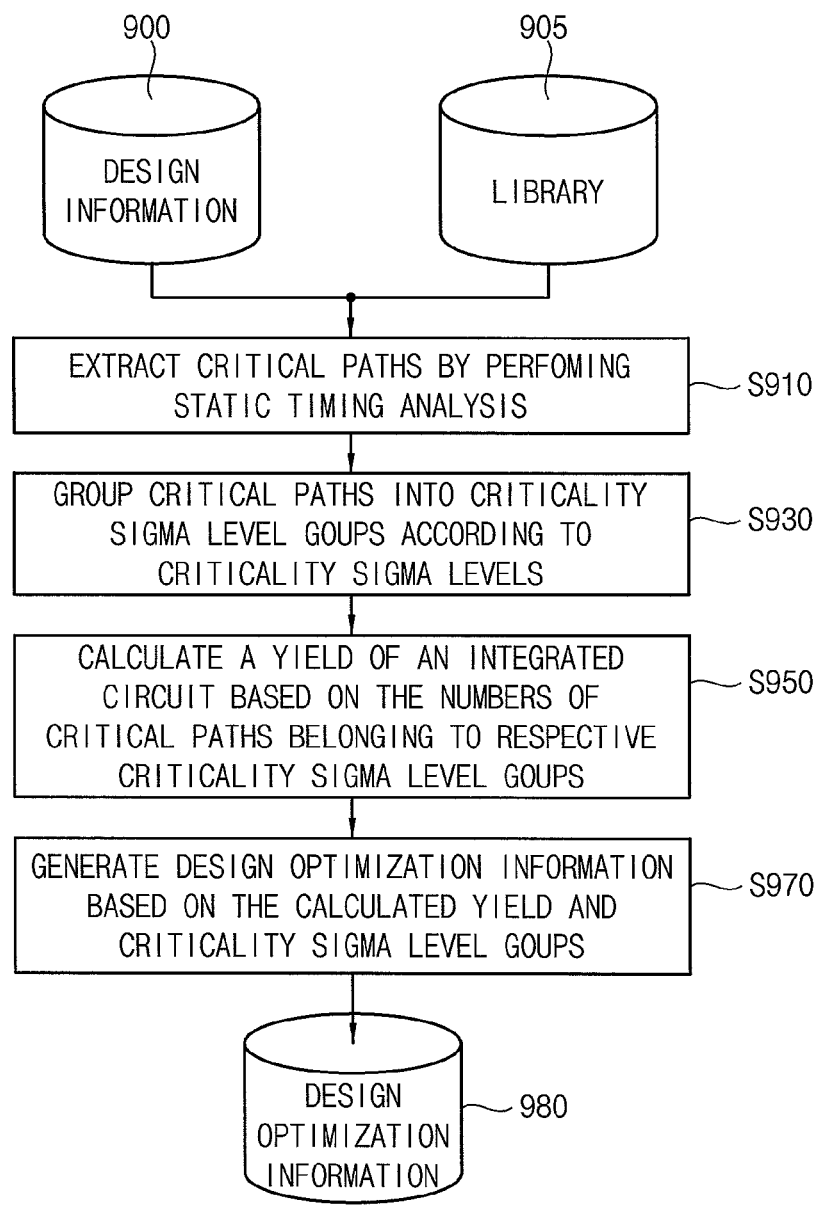
FIG. 9 is a flowchart illustrating a method of optimizing a design for an integrated circuit according to exemplary embodiments.

FIG. 9 is a flowchart illustrating a method of optimizing a design for an integrated circuit according to exemplary embodiments.

Referring to FIG. 9, in a method of optimizing a design for an integrated circuit, critical paths are extracted from timing paths included in the integrated circuit by performing an STA based on design information 900 for the integrated circuit and a library 905 for the integrated circuit (S910), the critical paths are grouped into criticality sigma level groups according to criticality sigma levels of the critical paths (S930), and a yield of the integrated circuit is calculated based on the numbers of the critical paths belonging to the respective criticality sigma level groups (S950).

Design optimization information 980 is generated based on the calculated yield of the integrated circuit and the criticality sigma level groups (S970). The design optimization information 980 may be an engineer change order (ECO) list that informs a designer of the integrated circuit about items to be changed in the design for the integrated circuit. In some exemplary embodiments, the design optimization information 980 may include information representing the number of the critical paths which need to be changed from a first one of the criticality sigma level groups to a second one of the criticality sigma level groups having a representative criticality sigma level higher than a representative criticality sigma level of the first one of the criticality sigma level groups. That is, the design optimization information 980 may indicate that the critical paths belonging to a lower criticality sigma level group should be changed to belong to a higher criticality sigma level group, and the integrated circuit designer may modify the design for the integrated circuit such that the critical paths are changed from the lower criticality sigma level group to the higher criticality sigma level group, thereby improving the yield of the integrated circuit.

In other exemplary embodiments, the design optimization information 980 may further include information representing the number of the critical paths which need to be changed from a third one of the criticality sigma level groups to a fourth one of the criticality sigma level groups having a representative criticality sigma level lower than a representative criticality sigma level of the third one of the criticality sigma level groups. Thus, the design optimization information 980 may indicate not only that the critical paths belonging to a first lower criticality sigma level group should be changed to belong to a first higher criticality sigma level group, but also that the critical paths belonging to a second higher criticality sigma level group should be changed to belong to a second lower criticality sigma level group. The integrated circuit designer may modify the design for the integrated circuit to change the critical paths. In this case, not only the yield of the integrated circuit may be improved, but also the design for the integrated may be optimized in power, size, etc.

Figure 10:
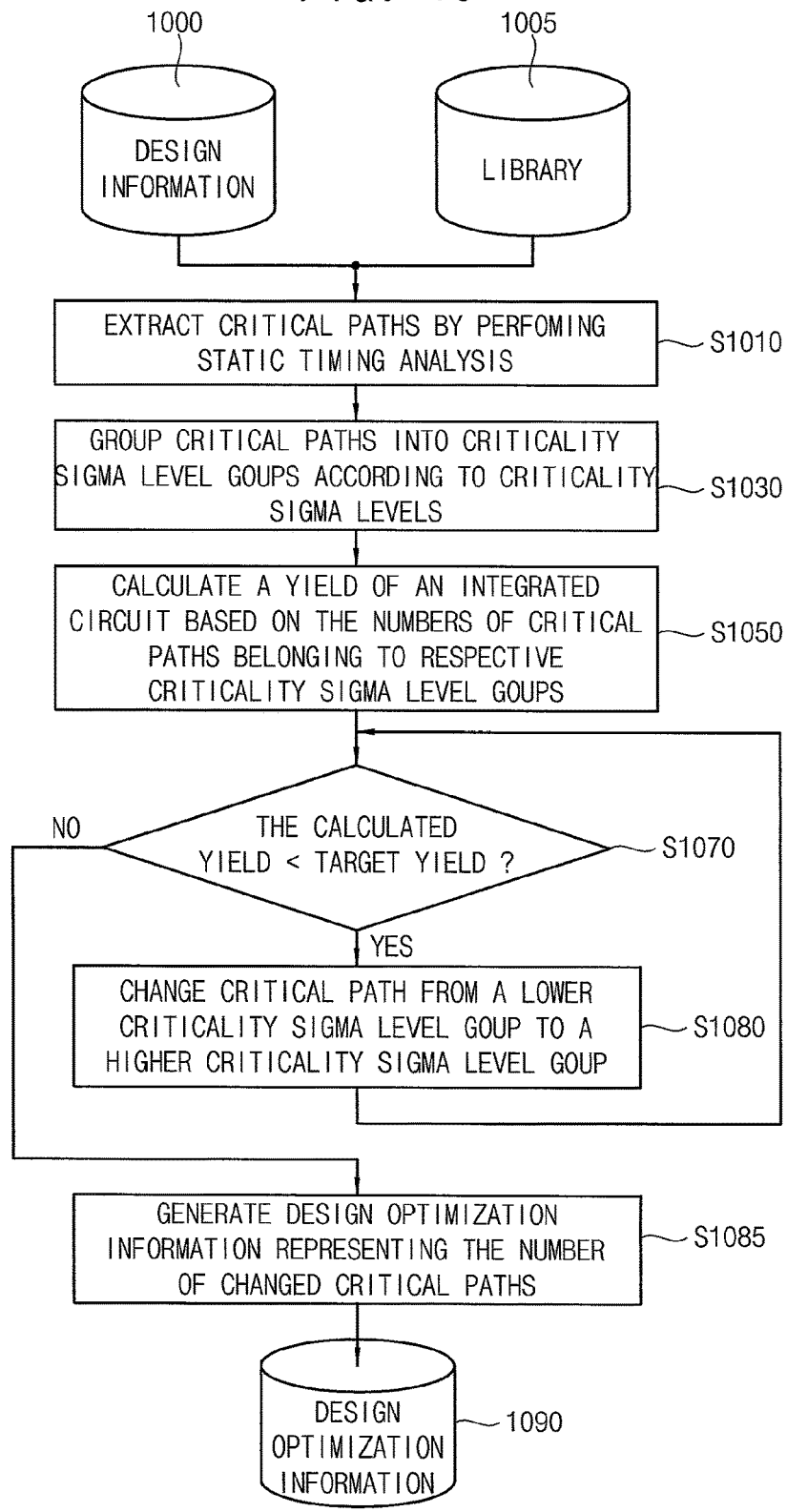
FIG. 10 is a flowchart illustrating a method of optimizing a design for an integrated circuit according to exemplary embodiments.
Figure 12:
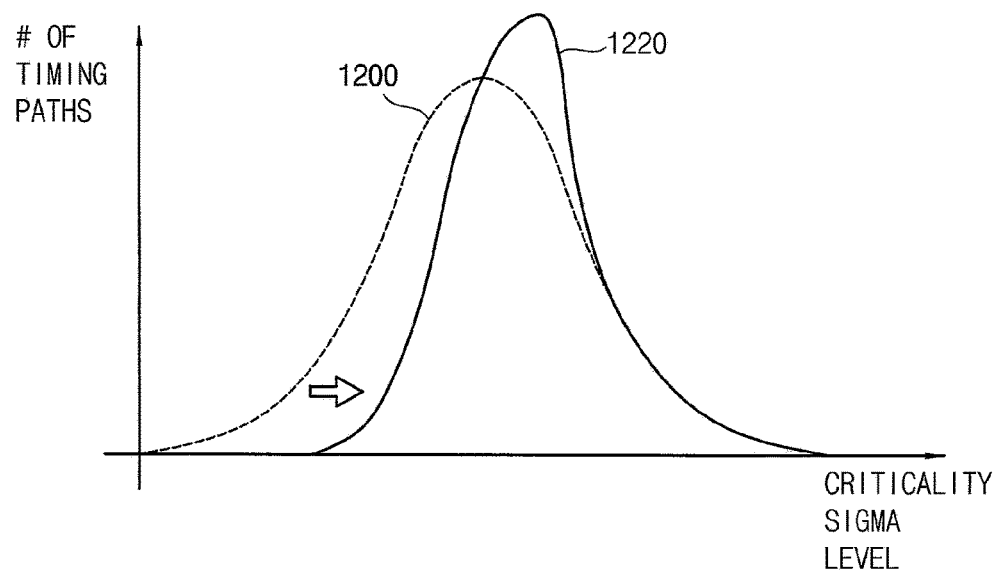
FIG. 12 is a diagram for describing an example where a criticality sigma level distribution of an integrated circuit is improved by the design optimization method of FIG. 10.

FIG. 10 is a flowchart illustrating a method of optimizing a design for an integrated circuit according to exemplary embodiments, FIG. 11 is a diagram for describing an example where a yield of an integrated circuit is improved by the design optimization method of FIG. 10, and FIG. 12 is a diagram for describing an example where a criticality sigma level distribution of an integrated circuit is improved by the design optimization method of FIG. 10.

Referring to FIG. 10, in a method of optimizing a design for an integrated circuit, critical paths may be extracted from timing paths included in the integrated circuit by performing an STA based on design information 1000 for the integrated circuit and a library 1005 for the integrated circuit (S1010), the critical paths may be grouped into criticality sigma level groups according to criticality sigma levels of the critical paths (S1030), and a yield of the integrated circuit may be calculated based on the numbers of the critical paths belonging to the respective criticality sigma level groups (S1050).

The calculated yield of the integrated circuit may be compared with a target yield for the integrated circuit (S1070). When the calculated yield is higher than or equal to the target yield (S1070: NO), design optimization information 1090 may not be generated, or the design optimization information 1090 indicating that no critical path needs to be changed may be generated (S1085).

When the calculated yield is lower than the target yield (S1070: YES), a critical path belonging to a lower criticality sigma level group (e.g., a criticality sigma level group having a lowest representative criticality sigma level) may be changed such that the critical path belongs to a higher criticality sigma level group (e.g., a criticality sigma level group having a second lowest representative criticality sigma level) (S1080), and this change of the critical path may be repeated until the calculated yield becomes higher than or equal to the target yield (S1070, S1080).

For example, in an example illustrated in FIGS. 5 and 11, the yield of the integrated circuit before the change of the critical path (or the change of the design of the integrated circuit) may be about 95.18396%. In this case, if the target yield for the integrated circuit is about 98.2%, the critical path belonging to the criticality sigma level group GROUP3 having the lowest representative sigma level may be changed to the criticality sigma level group GROUP4 having the second lowest representative sigma level, and this change may be repeated until the calculated yield becomes higher than or equal to the target yield. In the example illustrated in FIG. 11, 24 critical paths belonging to the criticality sigma level group GROUP3 having the representative sigma level of three may be changed to the criticality sigma level group GROUP4 having the representative sigma level of four. Accordingly, the yield of the integrated circuit may be improved to about 98.24563% higher than the target yield.

The design optimization information 1090 representing the number of the critical paths of which criticality sigma levels are changed may be generated (S1085), and an integrated circuit designer may modify or correct the design for the integrated circuit based on the design optimization information 1090 such that the change of the critical paths are reflected in the design for the integrated circuit. For example, as illustrated in FIG. 12, a criticality sigma level distribution of the integrated circuit of which the design is modified or corrected based on the design optimization information 1090 may be changed from a first criticality sigma level distribution 1200 to a second criticality sigma level distribution 1220. That is, criticality sigma levels of at least a portion of timing paths included in the integrated circuit may be increased, and thus the yield of the integrated circuit may be improved higher than the target yield.

Figure 13:
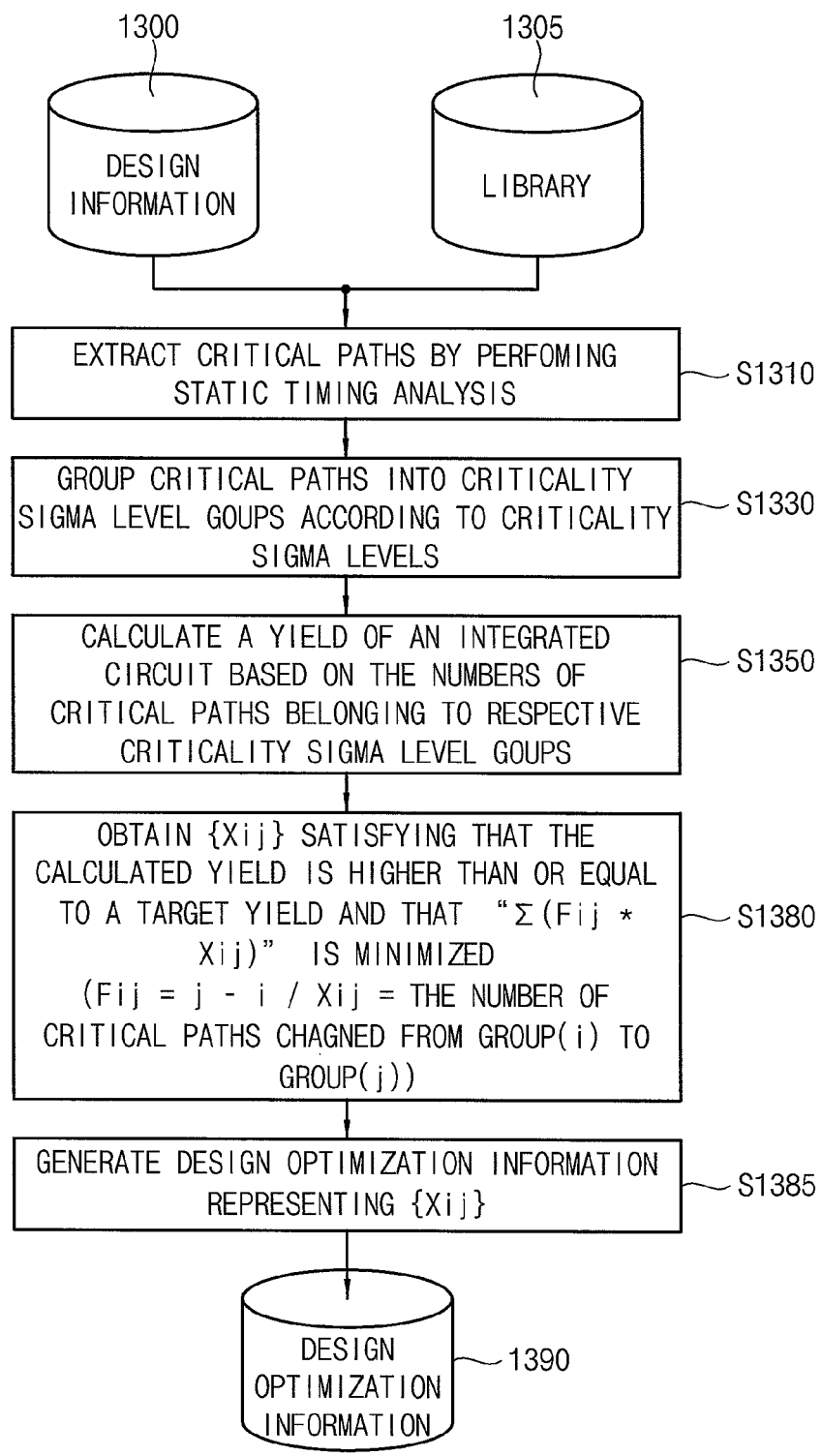
FIG. 13 is a flowchart illustrating a method of optimizing a design for an integrated circuit according to exemplary embodiments.
Figure 14:
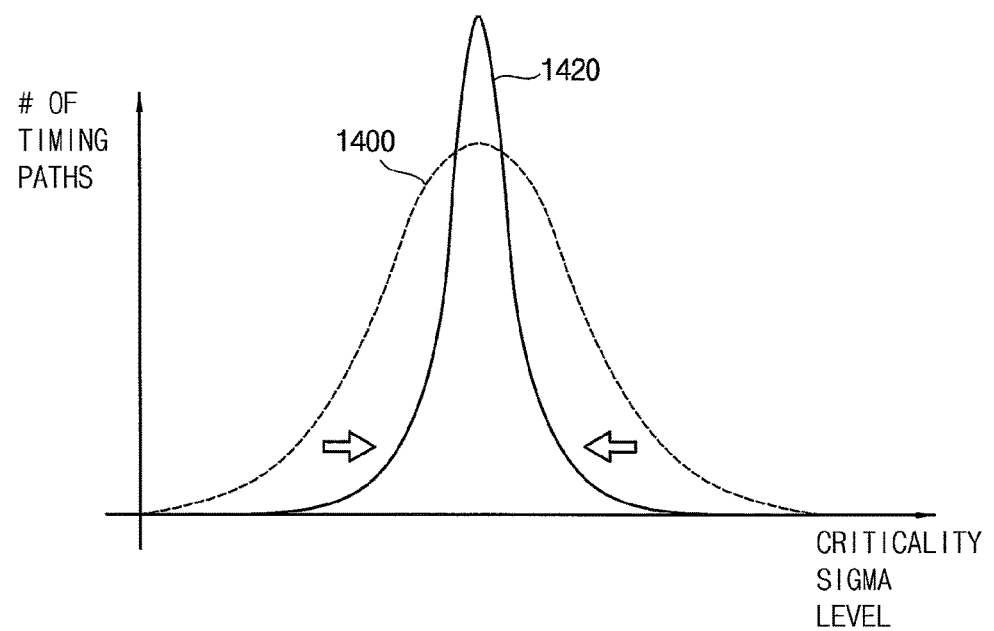
FIG. 14 is a diagram for describing an example where a criticality sigma level distribution of an integrated circuit is improved by the design optimization method of FIG. 13.

FIG. 13 is a flowchart illustrating a method of optimizing a design for an integrated circuit according to example embodiments, and FIG. 14 is a diagram for describing an example where a criticality sigma level distribution of an integrated circuit is improved by the design optimization method of FIG. 13.

Referring to FIG. 13, in a method of optimizing a design for an integrated circuit, critical paths may be extracted from timing paths included in the integrated circuit by performing an STA based on design information 1300 for the integrated circuit and a library 1305 for the integrated circuit (S1310), the critical paths may be grouped into criticality sigma level groups according to criticality sigma levels of the critical paths (S1330), and a yield of the integrated circuit may be calculated based on the numbers of the critical paths belonging to the respective criticality sigma level groups (S1350).

A set of $X_{ij}$ satisfying that the calculated yield is higher than or equal to a target yield and that an equation "$\Sigma(F_{ij}*X_{ij})$" (or an equation "$\Sigma((j-i)*X_{ij})$" is minimized may be obtained (S1380). Here, i is an integer representing a representative criticality sigma level of the criticality sigma level group to which the critical paths belong before optimization, j is an integer representing a representative criticality sigma level of the criticality sigma level group to which the critical paths belong after the optimization, $F_{ij}$ is a constant having a value of "j-i", and $X_{ij}$ represents a number of the critical paths changed from the criticality sigma level group having the representative criticality sigma level of i to the criticality sigma level group having the representative criticality sigma level of j.

In some exemplary embodiments, the set of $X_{ij}$ may be calculated by performing an integer linear programming for minimizing the equation "$\Sigma((j-i)*X_{ij})$". In this case, the integer linear programming may be performed such that a first constraint condition of an equation "$\Sigma(X_{ij}) \leq N_i$", a second constraint condition of an equation "$\log(\Pi P(N_i')) \geq \log(TY)$", and a third constraint condition that $X_{ij}$ is an integer greater than or equal to zero are satisfied. Here, $N_i$ represents the number of the critical paths of the criticality sigma level group having the representative criticality sigma level of i before the optimization, $N_i'$ represents the number of the critical paths of the criticality sigma level group having the representative criticality sigma level of i after the optimization, $P(N_i')$ represents the yield of the criticality sigma level group having the representative criticality sigma level of i after the optimization, and the TY represents the target yield. Thus, the first constraint condition indicates that the number of the critical paths changed to the i-criticality sigma level group should be less than or equal to the number of the critical paths of the i-criticality sigma level group before the optimization, the second constraint condition indicates that the yield of the integrated circuit after the optimization should be higher than or equal to the target yield, and the third constraint condition indicates that the number of the critical paths changed from the i-criticality sigma level group to the j-criticality sigma level group should be higher than or equal to zero.

Design optimization information 1390 representing the set of $X_{ij}$ may be generated (S1385), and an integrated circuit designer may modify or correct the design for the integrated circuit based on the design optimization information 1090 such that the set of $X_{ij}$ is reflected in the design for the integrated circuit. For example, as illustrated in FIG. 14, a criticality sigma level distribution of the integrated circuit of which the design is modified or corrected based on the design optimization information 1390 may be changed from a first criticality sigma level distribution 1400 to a second criticality sigma level distribution 1420. That is, criticality sigma levels of at least a portion of timing paths included in the integrated circuit may be increased, and thus the yield of the integrated circuit may be improved higher than the target yield. Further, criticality sigma levels of at least a portion of timing paths included in the integrated circuit may be decreased, and thus the design for the integrated circuit may be optimized in power, size, etc.

Figure 15:
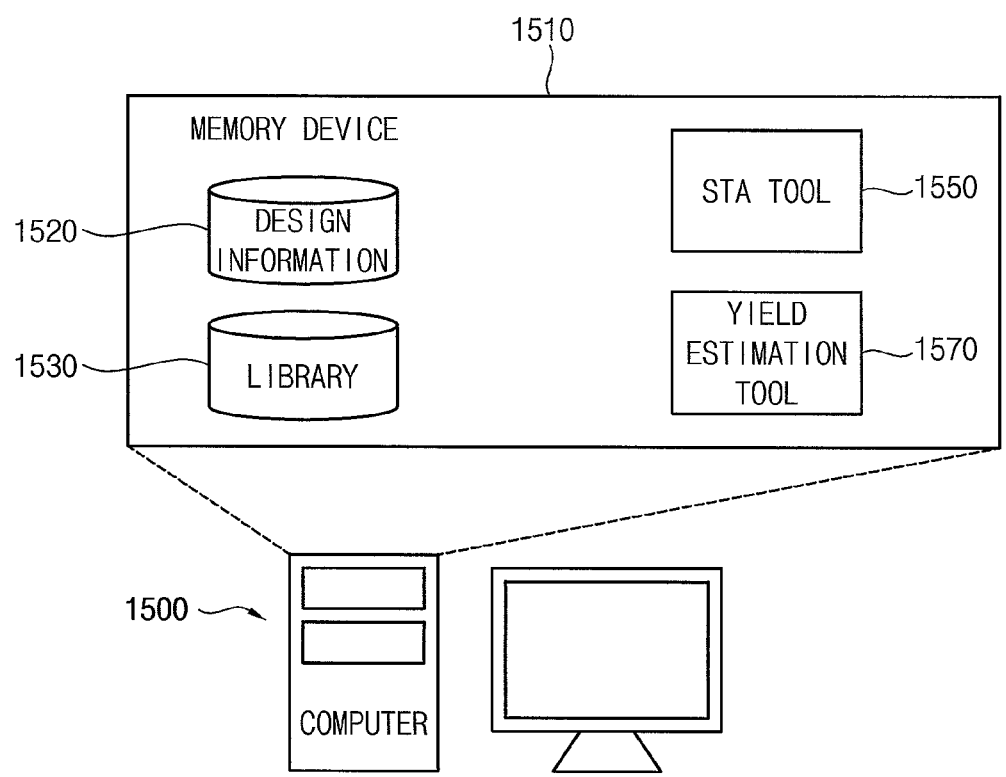
FIG. 15 is a computing system that performs a method of estimating a yield of an integrated circuit according to exemplary embodiments.

FIG. 15 is a computing system that performs a method of estimating a yield of an integrated circuit according to exemplary embodiments.

Referring to FIG. 15, a computing system 1500 that performs yield estimation and/or design optimization for an integrated circuit (e.g., a SoC) may include a processor and a memory device 1510. The processor may load design information 1520 and a library 1530 for the integrated circuit into the memory device 1510. The processor may further load a static timing analysis tool 1550 into the memory device 1510, and may execute the static timing analysis tool 1550 in the memory device 1510. The static timing analysis tool 1550 may extract critical paths by performing an STA (e.g., a GBA and/or a PBA) for the integrated circuit.

The processor may further load a yield estimation tool 1570 into the memory device 1510, and may further execute the yield estimation tool 1570 in the memory device 1510. The yield estimation tool 1570 may group the critical paths extracted by the STA into criticality sigma level groups according to criticality sigma levels of the critical paths, and may calculate a yield of the integrated circuit based on the numbers of the critical paths belonging to the respective criticality sigma level groups. In some exemplary embodiments, the yield estimation tool 1570 may generate design optimization information based on the calculated yield and/or the criticality sigma level groups. According to exemplary embodiments, the static timing analysis tool 1550 and the yield estimation tool 1570 may be implemented as one tool, or as separate tools.

The computing system 1500 that performs the yield estimation and/or the design optimization for the integrated circuit according to exemplary embodiments may group the critical paths into the criticality sigma level groups according to the criticality sigma levels, and thus may efficiently calculate the yield of the integrated circuit based on the criticality sigma level groups. Further, the computing system 1500 that performs the yield estimation and/or the design optimization for the integrated circuit according to exemplary embodiments may efficiently optimize the design for the integrated circuit based on the calculated yield.

As described above, the method of estimating the yield of the integrated circuit according to exemplary embodiments may group the critical paths into the criticality sigma level groups according to the criticality sigma levels of the critical paths extracted by STA, and may efficiently calculate the yield of the integrated circuit based on the criticality sigma level groups. Further, the method of optimizing the design for the integrated circuit according to exemplary embodiments can efficiently optimize the design for the integrated circuit based on the efficiently calculated yield of the integrated circuit.

The inventive concept may be applied to any tool, device, system and method for designing any integrated circuit. For example, the inventive concept may be applied to any tool, device, system and method for designing a system-on-chip.

The foregoing is illustrative of exemplary embodiments and is not to be construed as limiting thereof. Although a few exemplary embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of estimating a yield of an integrated circuit, the method comprising:
   obtaining, from a design of the integrated circuit, slack values relating to timing paths included in the integrated circuit;
   extracting critical paths from the timing paths included in the integrated circuit by using the slack values relating to the timing paths to perform a static timing analysis for the integrated circuit;
   determining, for each respective one of the critical paths, a corresponding criticality sigma level;
   grouping the critical paths into criticality sigma level groups according to the criticality sigma levels of the critical paths;
   determining the yield of the integrated circuit based on a number of the critical paths in each criticality sigma level group of the criticality sigma level groups;
   using a result of the determining the yield to modify the design of the integrated circuit; and manufacturing the integrated circuit based on the modified design of the integrated circuit.

2. The method of claim 1, wherein each critical path of the critical paths has a slack less than or equal to zero at a sigma level greater than or equal to a criticality sigma level of the each critical path.

3. The method of claim 1, wherein the extracting the critical paths comprises extracting the critical paths by performing, as the static timing analysis, a graph based analysis for the integrated circuit.

4. The method of claim 1, wherein the grouping the critical paths into the criticality sigma level groups comprises:
performing a path based analysis (PBA) for the critical paths at maximum criticality sigma levels of the criticality sigma level groups; and
determining the number of the critical paths in each criticality sigma level group of the criticality sigma level groups based on a result of the PBA performed at the maximum criticality sigma levels of the criticality sigma level groups.

5. The method of claim 4, wherein a number of the critical paths in a first criticality sigma level group among the criticality sigma level groups is determined based on a difference between a number of the critical paths at a first maximum criticality sigma level of the first criticality sigma level group and a number of the critical paths at a second maximum criticality sigma level of a second criticality sigma level group among the criticality sigma level groups.

6. The method of claim 1, wherein the grouping the critical paths into the criticality sigma level groups comprises:
determining the criticality sigma levels of the critical paths based on average slacks of the critical paths and 1-sigma level process variations of the critical paths; and
grouping the critical paths into the criticality sigma level groups based on the determined criticality sigma levels.

7. The method of claim 6, wherein determining the criticality sigma levels of the critical paths comprises determining the criticality sigma level of each critical path of the critical paths by dividing the average slack of the each critical path of the critical paths by the 1-sigma level process variation of the critical path.

8. The method of claim 1, wherein the determining the yield of the integrated circuit comprises:
determining yields of the criticality sigma level groups by raising a pass probability of each criticality sigma level group of the criticality sigma level groups to a power of the number of the critical paths in each criticality sigma level group of the criticality sigma level groups; and
determining the yield of the integrated circuit by multiplying the yields of the criticality sigma level groups together.

9. A method of optimizing a design for an integrated circuit, the method comprising:
obtaining, from a design of the integrated circuit, slack values relating to timing paths included in the integrated circuit;
extracting critical paths from the timing paths included in the integrated circuit by using the slack values relating to the timing paths to perform a static timing analysis for the integrated circuit;
determining, for each respective one of the critical paths, a corresponding criticality sigma level;
grouping the critical paths into criticality sigma level groups according to criticality sigma levels of the critical paths;
determining a yield of the integrated circuit based on a number of the critical paths in each criticality sigma level group of the criticality sigma level groups;
generating design optimization information based on the determined yield of the integrated circuit and the criticality sigma level groups;
using a result of the generating the design optimization information to modify the design of the integrated circuit; and
manufacturing the integrated circuit based on the modified design of the integrated circuit.

10. The method of claim 1, wherein the design optimization information comprises information representing a number of the critical paths which need to be changed from a first criticality sigma level group among the criticality sigma level groups to a second criticality sigma level group among the criticality sigma level groups.

11. The method of claim 10, wherein the second criticality sigma level group has a representative criticality sigma level greater than a representative criticality sigma level of the first criticality sigma level group.

12. The method of claim 11, wherein the design optimization information further comprises information representing a number of the critical paths which need to be changed from a third criticality sigma level group among the criticality sigma level groups to a fourth criticality sigma level group among the criticality sigma level groups, and
the fourth criticality sigma level group has a representative criticality sigma level lower than a representative criticality sigma level of the third criticality sigma level group.

13. The method of claim 9, further comprising comparing the determined yield of the integrated circuit with a target yield for the integrated circuit,
wherein the design optimization information is generated when the determined yield is lower than the target yield.

14. The method of claim 13, wherein the generating the design optimization information comprises:
until the determined yield becomes greater than or equal to the target yield, changing a critical path in a first criticality sigma level group having a lowest representative criticality sigma level among the criticality sigma level groups such that the critical path belongs to a second criticality sigma level group having a representative criticality sigma level greater than the lowest representative criticality sigma level among the criticality sigma level groups; and
generating the design optimization information representing a number of the critical paths changed from the first criticality sigma level group to the second criticality sigma level group.

15. The method of claim 9, wherein the generating the design optimization information comprises:
obtaining a set of Xij satisfying that the determined yield is greater than or equal to a target yield and that an equation $\Sigma((j-i)*Xij)$ is minimized, where i is an integer representing a representative criticality sigma level of the criticality sigma level group to which the critical paths belong before optimization, j is an integer representing a representative criticality sigma level of the criticality sigma level group to which the critical paths belong after the optimization, and Xij represents the number of the critical paths changed from the criticality sigma level group having the representative criticality sigma level of i to the criticality sigma level group having the representative criticality sigma level of j; and generating the design optimization information representing the set of Xij.

16. The method of claim 15, wherein the set of Xij is determined by performing an integer linear programming for the equation Σ((j−i)*Xij).

17. A method of optimizing a design for an integrated circuit, the method comprising:
   obtaining, from a design of the integrated circuit, slack values relating to timing paths included in the integrated circuit;
   extracting critical paths from the timing paths included in the integrated circuit by using the slack values relating to the timing paths to perform a graph based analysis for the integrated circuit;
   performing a path based analysis (PBA) for the critical paths at maximum criticality sigma levels of criticality sigma level groups;
   determining a number of the critical paths in each criticality sigma level group of the criticality sigma level groups based on a result of the PBA performed at the maximum criticality sigma levels of the criticality sigma level groups;
   determining a yield of the integrated circuit based on the number of the critical paths in each criticality sigma level group of the criticality sigma level groups;
   comparing the determined yield of the integrated circuit with a target yield for the integrated circuit;
   generating design optimization information based on a result of the comparing;
   using a result of the generating the design optimization information to modify the design of the integrated circuit; and
   manufacturing the integrated circuit based on the modified design of the integrated circuit.

18. The method of claim 17, wherein the determining the yield of the integrated circuit comprises:
   determining yields of the criticality sigma level groups by raising a pass probability of each criticality sigma level group of the criticality sigma level groups to a power of the number of the critical paths in each criticality sigma level group of the criticality sigma level groups; and
   determining the yield of the integrated circuit by multiplying the determined yields of the criticality sigma level groups together.

19. The method of claim 17, wherein the design optimization information comprises information representing a number of the critical paths which need to be changed from a first criticality sigma level group among the criticality sigma level groups to a second criticality sigma level group among the criticality sigma level groups, and
   the second criticality sigma level group has a representative criticality sigma level greater than a representative criticality sigma level of the first criticality sigma level group.

20. The method of claim 17, wherein the generating the design optimization information comprises:
   until the determined yield becomes greater than or equal to the target yield, changing a critical path in a first criticality sigma level group having a lowest representative criticality sigma level among the criticality sigma level groups such that the critical path belongs to a second criticality sigma level group having a representative criticality sigma level greater than the lowest representative criticality sigma level among the criticality sigma level groups; and
   generating the design optimization information representing a number of the critical paths changed from the first criticality sigma level group to the second criticality sigma level group.

* * * * *